United States Patent
Sugawara et al.

(10) Patent No.: US 6,858,340 B2
(45) Date of Patent: Feb. 22, 2005

(54) VARIABLE FLOW-RATE EJECTOR AND FUEL CELL SYSTEM HAVING THE SAME

(75) Inventors: Tatsuya Sugawara, Utsunomiya (JP); Shigekazu Kizaki, Kawagoe (JP); Yoshio Nuiya, Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 589 days.

(21) Appl. No.: 10/058,791

(22) Filed: Jan. 30, 2002

(65) Prior Publication Data

US 2002/0106547 A1 Aug. 8, 2002

(30) Foreign Application Priority Data

Feb. 2, 2001 (JP) .................................... P2001-026997

(51) Int. Cl.[7] ................................................. H01M 2/00
(52) U.S. Cl. ........................... 429/34; 239/88; 239/96; 239/124; 239/432; 239/434; 239/533.2
(58) Field of Search .............................. 429/34, 38, 39; 239/88, 96, 124, 432, 434, 533.2

(56) References Cited

U.S. PATENT DOCUMENTS

| | | | | |
|---|---|---|---|---|
| 5,967,164 A | * | 10/1999 | Denda et al. | 137/1 |
| 5,979,790 A | * | 11/1999 | Gurich et al. | 239/88 |
| 6,547,164 B2 | * | 4/2003 | Miquel et al. | 239/432 |
| 6,662,767 B1 | * | 12/2003 | Nonaka | 123/73 A |
| 6,670,067 B2 | * | 12/2003 | Sato et al. | 429/34 |
| 6,701,715 B2 | * | 3/2004 | Anderson et al. | 60/782 |
| 6,705,543 B2 | * | 3/2004 | Carroll et al. | 239/96 |
| 6,715,737 B2 | * | 4/2004 | Galka et al. | 261/35 |

FOREIGN PATENT DOCUMENTS

| | | |
|---|---|---|
| JP | 08-338398 | 12/1996 |
| JP | 09-213353 | 8/1997 |
| JP | 2002-056868 | * 2/2002 |
| JP | 2002-056869 | * 2/2002 |

* cited by examiner

*Primary Examiner*—Bruce F. Bell
(74) *Attorney, Agent, or Firm*—Arent Fox PLLC

(57) ABSTRACT

A variable flow-rate ejector for precisely controlling the flow rate based on pressure is disclosed. The ejector has a simple mechanical structure which comprises a nozzle for ejecting a first fluid; a diffuser into which a second fluid is drawn due to a negative pressure produced around the first fluid, where the first and second fluids are merged; a third-fluid chamber formed by first and second diaphragms attached to the needle, and the body of the ejector; and a fourth-fluid chamber formed by the second diaphragm and the body. The area of an opening around the needle in the opening at the head of the nozzle is changed by displacement of the needle along the central axis according to movement of first and second diaphragms which move in accordance with the pressure produced by the first fluid, the third fluid, and the fourth fluid.

5 Claims, 3 Drawing Sheets

VARIABLE FLOW-RATE EJECTOR AND FUEL CELL SYSTEM HAVING THE SAME

BACKGROUND OF THE INVENTION

1. Field of the Invention

The present invention relates to an ejector, connected to a fuel cell or the like, for merging fuel discharged from the fuel cell with fuel which is newly supplied, so as to recirculate the fuel. In particular, the present invention relates to a technique for varying the flow rate of the fuel.

2. Description of the Related Art

In conventional solid polymer membrane-type fuel cells, each cell has an anode and a cathode which are provided on either side of a solid polymer electrolyte membrane. A plurality of such cells are stacked so as to form a stack, which is called the "fuel cell" in the following explanations. In the fuel cell, hydrogen, which functions as fuel, is supplied to the anode, while air, which functions as an oxidizing gas, is supplied to the cathode. The catalytic reaction on the anode generates hydrogen ions, and the hydrogen ions are transferred to the cathode via an electrolyte membrane. The transferred hydrogen ions react with oxygen on the cathode, thereby generating electric power.

In order to maintain the ion conductivity of the solid polymer electrolyte membrane, excess water is mixed with the hydrogen which is supplied to the fuel cell, by using a humidifier or the like. Therefore, a specific flow rate of the discharged fuel is set to prevent the buildup of water in the gas passages of the electrodes of the fuel cell.

The discharged fuel is merged with fuel which is newly supplied to the fuel cell, so as to recirculate the fuel. Accordingly, the fuel can be effectively used and the energy efficiency of the solid polymer membrane-type fuel cell can be improved.

Japanese Unexamined Patent Application, First Publication No. Hei 9-213353 discloses an example of such a conventional fuel cell system, in which discharged fuel is recirculated by using an ejector. In the ejector, a second fluid chamber is connected to an opening at the base end (i.e., the end at the base side) of a diffuser which has a tapered inner-peripheral face, and the end of a nozzle, which is arranged coaxially to the diffuser, protrudes into the second fluid chamber; thus, the end of the nozzle faces the opening at the base end of the diffuser. The fuel supplied to the ejector is ejected from the end of the nozzle towards the opening at the base end of the diffuser, so that the discharged fuel supplied to the second fluid chamber is entrained in the above high-speed fuel stream ejected from the nozzle towards the diffuser.

In the above fuel cell system, a pressure gage is provided in a passage for recirculating the discharged fuel. Based on the value detected by the pressure gage, the degree of opening of the fuel supply valve of the ejector is controlled, so that the flow rates of the fuel recharged by the ejector and the newly-supplied fuel can be changed.

A flow meter is provided at the downstream side of the ejector. Based on the value detected by the flow meter, feedback control for the flow rate of the discharged fuel and the newly-supplied fuel is performed, thereby controlling the quantity of the fuel which is consumed in the fuel cell, that is, the output of the fuel cell system.

Japanese Unexamined Patent Application, First Publication No. Hei 8-338398 discloses a variable flow-rate ejector which has a nozzle including a regulating rod which is movable in the axial direction of the nozzle. The open area at the head of the nozzle can be changed by moving the rod in the axial direction by using a driving device (i.e., actuator). According to this function of changing the area of the opening of the head of the nozzle of the variable flow-rate ejector, it is possible to change the index for indicating the efficiency of drawing the fuel from the second fluid chamber into the diffuser, where the index is specifically a ratio of the flow rate Qt of the fuel drawn out from the second fluid chamber into the diffuser to the flow rate Qa of the fuel ejected from the nozzle (i.e., Qt/Qa).

However, when a variable flow-rate ejector employing an orifice whose flow rate is variable is provided in the conventional fuel cell system as explained above, the pressure and flow rate of the fuel must be detected in a plurality of passages in the fuel cell system, so as to perform the feedback control. Therefore, the structure and the control of the fuel cell system are complicated.

In addition, in the mechanism of changing the flow rate by using an actuator as used in the above conventional example, a specific differential pressure between the fuel-supplied electrode and the air-supplied electrode must be controlled with high precision. Therefore, the costs may be increased so as to improve the precision of the actuator, or the size of the actuator may be increased.

SUMMARY OF THE INVENTION

In consideration of the above circumstances, an object of the present invention is to provide a variable flow-rate ejector for precisely controlling the flow rate based on pressure control, by using a simple structure without employing electrical control.

Therefore, the present invention provides a variable flow-rate ejector comprising:

a body (e.g., a body 10a in an embodiment explained below);

a nozzle (e.g., a nozzle 32 in the embodiment explained below) having a head and a base, each of which has an opening, wherein the nozzle ejects a first fluid from the opening at the head;

a diffuser (e.g., a diffuser 31 in the embodiment explained below) whose central axis coincides with that of the nozzle, wherein a second fluid is drawn into the diffuser due to a negative pressure produced around the first fluid ejected by the nozzle, and the second fluid is entrained with the first fluid and the mixed fluid is output;

a needle (e.g., a needle 33 in the embodiment explained below) inserted into the nozzle, wherein the central axis of the needle coincides with that of the nozzle and the needle is movable along the central axis;

a first diaphragm (e.g., a first diaphragm 35 in the embodiment explained below) whose peripheral portion is supported by the body and which is provided for closing the opening at the base of the nozzle, wherein the first diaphragm is attached to the needle and is movable along the central axis of the needle;

a second diaphragm (e.g., a second diaphragm 36 in the embodiment explained below) whose peripheral portion is supported by the body and which is arranged at a distance from the first diaphragm, wherein the second diaphragm is attached to the needle and is movable along the central axis of the needle;

a third-fluid chamber (e.g., an air electrode pressure supply chamber 54 in the embodiment explained below) formed by the first diaphragm, the second diaphragm, and the body and arranged adjacent to the inside of the nozzle via the first diaphragm, wherein the first fluid is supplied to the nozzle and a third fluid is supplied to the third-fluid chamber; and a fourth-fluid chamber (e.g., a fuel electrode pressure supply chamber 56 in the embodiment explained below) formed by the second diaphragm and the body and arranged adjacent to the third-fluid chamber via the second diaphragm, wherein a fourth fluid is supplied to the fourth-fluid chamber, wherein:

an area of an opening around the needle in the opening at the head of the nozzle is changed by displacement of the needle along the central axis according to movement of the first and second diaphragms which move in accordance with the pressure produced by the first fluid, the third fluid, and the fourth fluid.

According to the above structure, the first fluid supplied to the nozzle is ejected from through the opening at the heat of the nozzle. In the nozzle, the needle which is movable along the central axis is inserted. Therefore, the area of the opening around the needle in the opening at the head of the nozzle can be changed by adjusting the position of the needle, for example, by making the needle protrude from the opening. Accordingly, the flow rate of the first fluid, which is ejected from the gap between the nozzle and the needle, can be controlled.

The first and second diaphragms, each being movable along the central axis of the needle, are attached to the needle. Therefore, the position of the needle is shifted according to the movement of the first and second diaphragms.

Here, the first diaphragm separates the inside of the nozzle and the third-fluid chamber, and the position of the first diaphragm is determined based on the balance between the pressure of the first fluid (supplied to the nozzle) and the pressure of the third fluid (supplied to the third-fluid chamber). The second diaphragm separates the third-fluid chamber and the fourth-fluid chamber, and the position of the second diaphragm is determined based on the balance between the pressure of the third fluid (supplied to the third-fluid chamber) and the pressure of the fourth fluid (supplied to the fourth-fluid chamber). Accordingly, the flow rate of the mixture of the first fluid and the second fluid, which is output from the diffuser, can be reliably controlled only by performing a mechanical control based on the pressure balance of the first, third, and fourth fluids. Therefore, in comparison with precise control of the flow rate using an electric driving device or the like, reliable flow-rate control can be performed based on the pressure while using a simpler structure.

The variable flow-rate ejector may further comprise a passage (e.g., a fuel electrode pressure supply passage 57 in the embodiment explained below) for supplying the mixed fluid, which is output by the diffuser, to the fourth-fluid chamber as the fourth fluid.

The present invention also provides a fuel cell system including a variable flow-rate ejector as explained above, comprising a fuel cell which has an anode and a cathode, and a fuel supply section (e.g., a fuel supply side pressure control section 27 in the embodiment explained below) for supplying fuel to the fuel cell, wherein:

the first fluid is fuel supplied to the anode from the fuel supply section; and the second fluid is fuel discharged from the fuel cell.

According to the fuel cell system, when the fuel discharged from the fuel cell at a specific flow rate is merged with fuel which is newly supplied to the fuel cell so as to recirculate the fuel, the flow rate of the mixture of the discharged fuel and the newly-supplied fuel can be reliably controlled only by performing a mechanical control based on the pressure balance of the first, third, and fourth fluids. Accordingly, in comparison with precise control of the flow rate using an electric driving device or the like, reliable flow-rate control can be performed based on the pressure while using a simpler structure. Therefore, it is possible to prevent the control of the fuel cell system from being complicated, and to reduce the cost necessary for constructing the system.

The fuel cell system may further comprise an oxidizing gas supply section (e.g., an oxidizing gas supply section 24 in the embodiment explained below) for supplying an oxidizing gas to the fuel cell, wherein:

the third fluid is an oxidizing gas supplied to the cathode of the fuel cell from the oxidizing gas supply section; and the fourth fluid is a mixture of the first fluid and the second fluid, which is output by the diffuser.

According to this structure, the differential pressure between the pressure of the oxidizing gas supplied to the fuel cell and the pressure of the fuel supplied from the fuel supply section is applied to the first diaphragm. Conversely, the differential pressure between the pressure of the third fluid and the pressure of the fourth fluid is applied to the second diaphragm, wherein this differential pressure corresponds to the differential pressure between the electrodes of the fuel cell. Accordingly, if the amount of fuel consumed in the fuel cell is changed (e.g., decreased) and thus the differential pressure between the electrodes of the fuel cell is changed (in the above example, increased), then the first and second diaphragms are displaced according to the changes in the differential pressures which are respectively applied to the diaphragms. Therefore, the position of the needle in the nozzle is changed, so that the flow rate of the mixture of the discharged fuel and the newly-supplied fuel can be suitably controlled. Accordingly, in comparison with precise control of the flow rate using an electric driving device or the like, reliable flow-rate control can be performed based on the pressure while a simpler structure is used and a required differential pressure between the electrodes, which is necessary for the fuel cell, is maintained.

In the above fuel cell system, the fuel supply section may supply the fuel based on a value of the pressure obtained by adding a predetermined pressure to the pressure of the oxidizing gas, and the ratio of the area of the first diaphragm to the area of the second diaphragm may be determined based on the predetermined pressure and a differential pressure between a pressure applied to the anode and a pressure applied to the cathode of the fuel cell.

In this case, while no pressure is applied to the first and second diaphragms, the ratio of the area of the first diaphragm to the area of the second diaphragm for realizing a balanced state of the pressure of each diaphragm can be determined based on the differential pressure between the electrodes of the fuel cell and the pressure of the fuel supplied by the fuel supply section which is determined according to the pressure of the oxidizing gas. When the diaphragms receive a pressure and the differential pressure between the electrodes is changed, the diaphragms move from their neutral positions, thereby changing the position of the needle along the central axis of the needle. Therefore, the flow rates of the fuel supplied to the fuel cell and the fuel discharged from the fuel cell can be automatically set to suitable values.

DESCRIPTION OF THE PREFERRED EMBODIMENTS

Hereinafter, the structure of the variable flow-rate ejector as an embodiment of the present invention will be explained with reference to the drawings.

Figure 1:
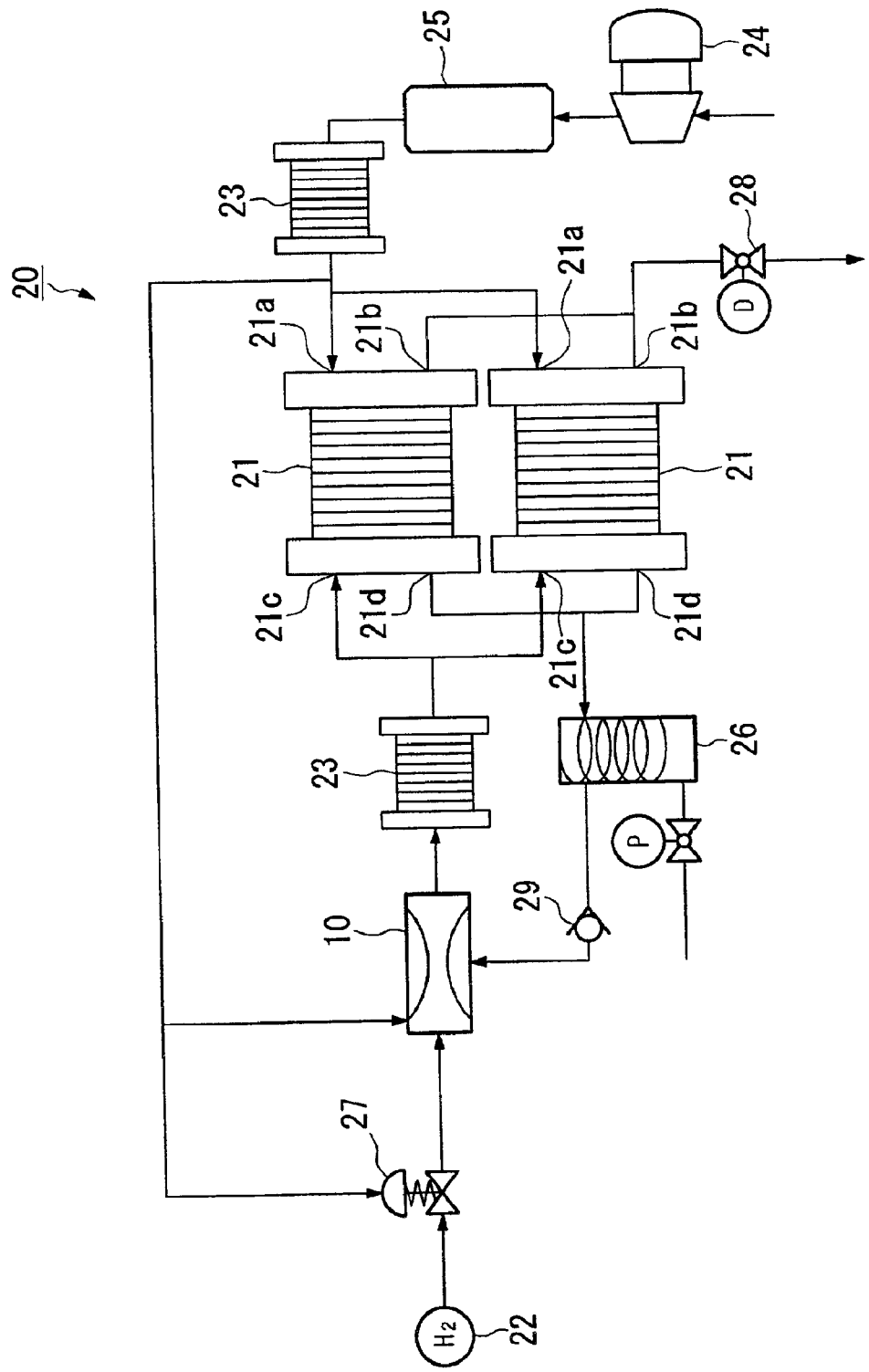
FIG. 1 is a diagram showing the structure of a fuel cell system which has a variable flow-rate ejector as an embodiment of the present invention.
Figure 2:
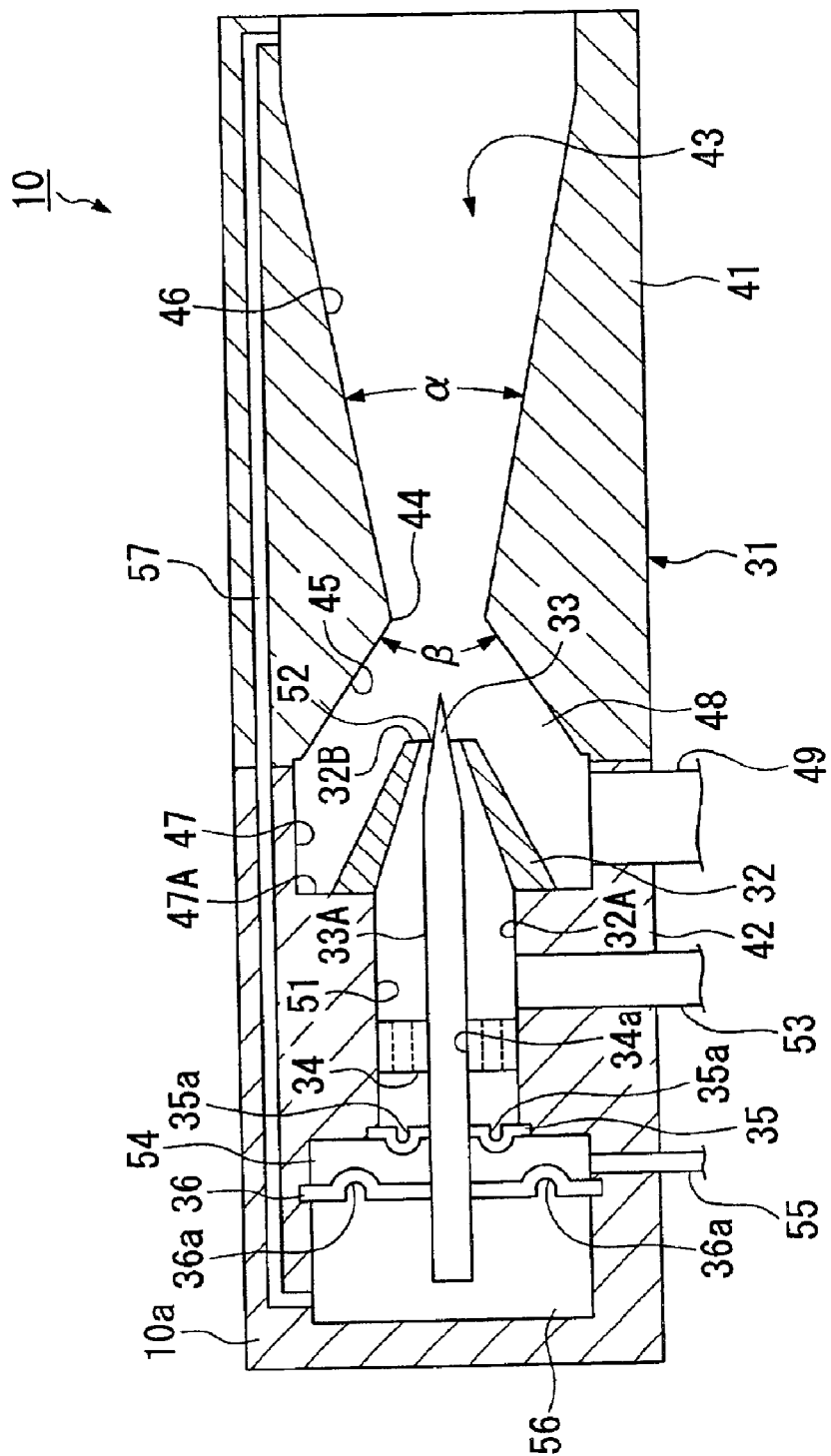
FIG. 2 is a cross-sectional side view of the variable flow-rate ejector.

FIG. 1 is a diagram showing the structure of a fuel cell system 20 which has a variable flow-rate ejector 10 as an embodiment of the present invention. FIG. 2 is a cross-sectional side view of the variable flow-rate ejector 10.

The variable flow-rate ejector 10 is provided in the fuel cell system 20 which is built, for example, in an electric vehicle or the like. The fuel cell system 20 includes the variable flow-rate ejector 10, a fuel cell 21, a fuel supply section 22, a humidifying section 23, an oxidizing gas supply section 24, a heat exchanging section 25, a water separating section 26, and a fuel supply side pressure control section 27.

In the fuel cell 21, each unit cell has an anode and a cathode which are provided on either side of a solid polymer electrolyte membrane which may be a solid polymer ionic exchange membrane. A plurality of the unit cells are stacked so as to form a stack. The fuel cell 21 has a fuel electrode to which hydrogen (which functions as fuel) is supplied and an air electrode to which air is supplied, the air including oxygen and functioning as an oxidizing gas.

In the air electrode, an air inlet 21a and an air outlet 21b are provided Air is supplied through the air inlet 21a from the oxidizing gas supply section 24, and the air outlet 21b has an air discharge valve 28 for discharging the air and the like in the air electrode to the outside.

In the fuel electrode, a fuel inlet 21c for supplying hydrogen and a fuel outlet 21d for discharging the hydrogen and the like in the fuel electrode are provided.

The humidifying section 23 is provided for mixing the fuel, which is supplied from the fuel supply section 22, with water vapor so as to supply humidified hydrogen to the fuel cell 21, and for mixing the oxidizing gas (such as air) supplied from the oxidizing gas supply section 24 with water vapor so as to supply humidified air to the fuel cell 21. Accordingly, the required ion conductivity of the solid polymer electrolyte membrane is maintained.

The oxidizing gas supply section 24 may employ an air compressor and is controlled based on the load of the fuel cell 21, an input signal from an accelerator pedal, and the like. The oxidizing gas supply section 24 supplies air via the heat exchanging section 25 to the air electrode of the fuel cell 21. The oxidizing gas supply section 24 also supplies air (i) as a signal pressure used in the fuel supply side pressure control section 27 and (ii) for pressure control of the variable flow-rate ejector 10 (as explained below).

The hydrogen as the fuel is supplied from the fuel inlet 21c to the fuel electrode of the fuel cell 21 via the fuel supply side pressure control section 27, the variable flow-rate ejector 10, and the humidifying section 23 in turn.

In addition, the water in the fuel discharged from the fuel outlet 21d of the fuel cell 21 is removed in the water separating section 16, and this discharged fuel, from which the water has been removed, is supplied via a check valve 29 to the variable flow-rate ejector 10. As explained below, the fuel supplied from the fuel supply side pressure control section 27 is merged with the fuel discharged from the fuel cell 21, and the merged fluid is supplied to the fuel cell 21.

The fuel supply side pressure control section 27 may employ a pneumatic proportional pressure control valve and uses the pressure of the air supplied from the oxidizing gas supply section 24 as a signal pressure for setting the "supply" pressure of the fuel at the outlet of the pressure control section 27 (i.e., the fuel which has passed through the fuel supply side pressure control section 27).

The variable flow-rate ejector 10 controls the flow rate of the fuel supplied to the fuel cell 21 based on the pressure $P_{air}$ of the air at the air electrode of the fuel cell 21 and on the pressure $P_{fuel}$ of the fuel at the fuel electrode of the fuel cell 21. As shown in FIG. 2, the variable flow-rate ejector 10 may comprise a diffuser 31, a nozzle 32, a needle 33, a needle holding guide 34, a first diaphragm 35, and a second diaphragm 36.

The diffuser 31 consists of a first block 41 and a second block 42 which are coaxially coupled with each other, where the first block 41 is placed downstream (i.e., the right side in FIG. 2) while the second block 42 is placed upstream (i.e., the left side in FIG. 2). A fluid passage 43 is formed through the first block 41 in the axial direction of the diffuser 31. The fluid passage 43 has a throat portion 44 which has the smallest inner diameter. Upstream of the throat portion 44, a diameter-decreasing portion 45 is provided, in which the diameter is gradually decreased in the downstream direction. Conversely, downstream of the throat portion 44, a diameter-increasing portion 46 is provided, in which the diameter is gradually increased in the downstream direction. The angle $\alpha$ corresponding to the diameter increase of the diameter-increasing portion 46 is smaller than the angle $\beta$ corresponding to the diameter decrease of the diameter-decreasing portion 45 (see FIG. 2).

The second block 42 has an opening 47 arranged in the axial direction. The downstream end of the opening 47 is communicated with the diameter-decreasing portion 45 of the first block 41. A nozzle 32 is attached to the upstream end of the opening 47 such that the nozzle 32 protrudes from an end face 47A (at the upstream side) in a direction coaxial to the axis of the diffuser 31.

The space which is present at the downstream side of the nozzle 32 and which is formed by the diameter-decreasing portion 45 of the first block 41 and the opening 47 of the second block 42 functions as the second fluid chamber 48. A second fluid introducing passage 49 for supplying the discharged fuel (which is discharged from the fuel cell 21) to the second fluid chamber 48 is connected to the second block 42.

A fluid passage 51 is formed through the nozzle 32 in the axial direction of the nozzle 32. The inner-peripheral face 32A of the nozzle 32, which corresponds to the wall surface of the fluid passage 51, is formed in a manner such that in the vicinity of the end of the nozzle 32, the diameter gradually decreases towards the end of the nozzle 32 (i.e., towards the downstream side of the fluid passage 51). The downstream end of the fluid passage 51 has an opening 52 whose position coincides with the end face 32B of the nozzle 32. The upstream end of the fluid passage 51 is closed by the first diaphragm 35.

In addition, a fuel supply passage 53 is connected to the fluid passage 51, so as to receive fuel which is supplied from the fuel supply section 22 via the fuel supply side pressure control section 27.

A needle 33 is coaxially inserted into the nozzle 32 and is held by a needle holding guide 34 such that the needle 33 is movable in the axial direction of the nozzle 32. The outer-peripheral face 33A of the needle 33 is shaped such that in the vicinity of the end of the needle 33, its diameter gradually decreases towards its end.

When the needle 33 moves inside the nozzle 32 in the axial direction, the length of the end portion of the needle 33 protruding from the opening 52 of the nozzle 32 can be changed. Accordingly, the area of the opening between the inner-peripheral face 32A of the nozzle 32 and the outer-peripheral face 33A of the needle 33 can be changed, thereby controlling the flow rate of the fuel which is ejected from the opening 52 of the nozzle 32 into the second fluid chamber 48.

The needle holding guide 34 for holding the needle 33 in a movable form in the axial direction may be disk-shaped with one or more through holes through which fluid can pass. The needle 33 is inserted through a needle insertion hole 34a which passes through the needle holding guide 34 in the axial direction of the guide.

The needle 33 may be movable in an arrangement wherein it is inserted through the needle insertion hole 34a, fixed to the insertion hole, and the needle holding guide 34 is movable while the outer-peripheral face of the needle holding guide 34 contacts the inner-peripheral face 32A of the nozzle 32.

The needle 33 may also be movable in an arrangement wherein the needle holding guide 34 is fixed in contact with the inner-peripheral face 32A of the nozzle 32, and the needle 33 is movable through the needle insertion hole 34a.

The first diaphragm 35 and the second diaphragm 36 are attached to the base portion of the needle 33. The first diaphragm 35 is provided for closing the upstream end of the fluid passage 51 in the nozzle 32, and the second diaphragm 36 is placed downstream of the first diaphragm 35 and separated from the first diaphragm 35 by a specific distance. The first and second diaphragms 35 and 36 are supported by the body 10a of the variable flow-rate ejector 10. A central portion of each of the first and second diaphragms 35 and 36 is movable in the axial direction of the diffuser 31 but not movable in the direction perpendicular to the axial direction, due to elastically-deformable portions 35a and 36a (each being called "deformable portion", hereinbelow). The needle 33 moves in the axial direction according to the movement of the first and second diaphragms 35 and 36.

An air electrode pressure supply chamber 54 is formed by the first diaphragm 35, the second diaphragm 36, and the body 10a; thus, the air electrode pressure supply chamber 54 is adjacent to the fluid passage 51 (in the nozzle 32) in the axial direction via the first diaphragm 35. An air electrode pressure supply passage 55 for receiving a portion of air supplied to the air electrode of the fuel cell 21 is connected to the air electrode pressure supply chamber 54.

As shown by the following formula (1), the pressure $\Delta P1$ applied to the first diaphragm 35 is obtained by subtracting the air pressure $P_{air}$ at the air electrode of the fuel cell 21 from the pressure Pa of the fuel supplied from the fuel supply section 22 via the fuel supply side pressure control section 27 to the fluid passage 51 in the nozzle 32.

$$\Delta P1 = Pa - P_{air} \qquad (1)$$

A fuel electrode pressure supply chamber 56 is formed by the second diaphragm 36 and the body 10a; thus, the fuel electrode pressure supply chamber 56 is adjacent to the air electrode pressure supply chamber 54 in the axial direction via the second diaphragm 36. A fuel electrode pressure supply passage 57 for receiving a portion of the fuel supplied to the fuel electrode of the fuel cell 21 is connected to the fuel electrode pressure supply chamber 56. As the fuel electrode pressure supply passage 57 is built into the ejector 10, conveniently, no extra passage is necessary when the components of the fuel cell system are assembled.

As shown by the following formula (2), the pressure $\Delta P2$ applied to the second diaphragm 36 is obtained by subtracting the air pressure $P_{air}$ at the air electrode of the fuel cell 21 from the fuel pressure $P_{fuel}$ at the fuel electrode of the fuel cell 21, that is, $\Delta P2$ indicates the differential pressure between the two electrodes of the fuel cell 21.

$$\Delta P2 = P_{fuel} - P_{air} \qquad (2)$$

Here, the end of the fuel electrode pressure supply passage 57 is connected to the fuel electrode pressure supply chamber 56, and the other end is connected to, typically, a portion in the vicinity of the downstream-side end of the diffuser 31.

Figure 3:
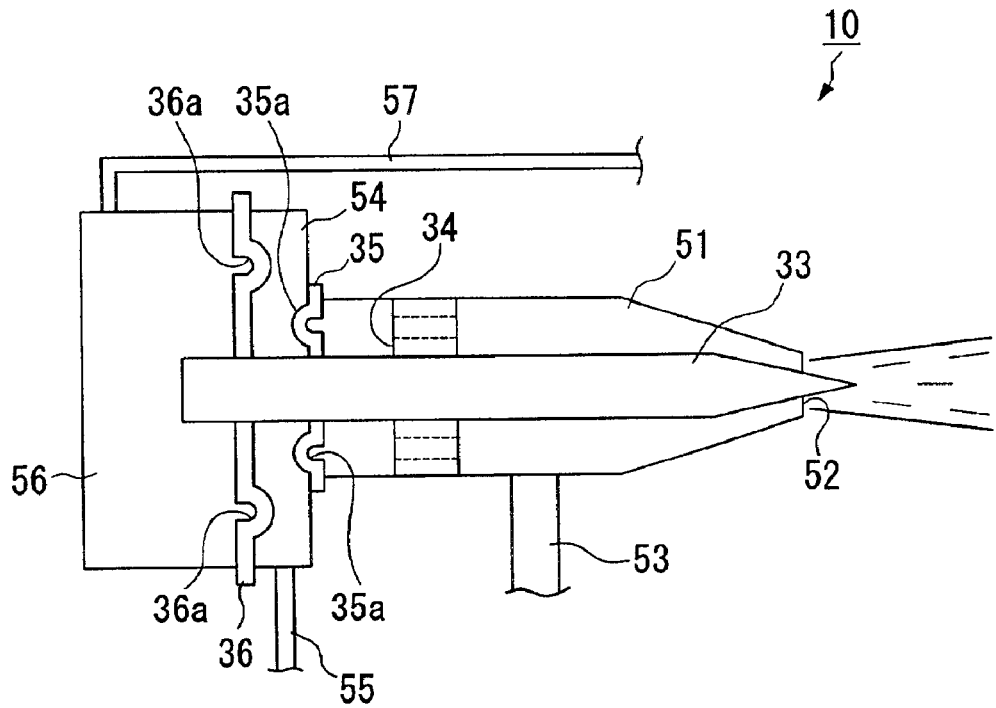
FIG. 3 is a diagram showing the general structure of a distinctive portion of the variable flow-rate ejector for explaining changes in the flow rate of the variable flow-rate ejector according to changes in the differential pressure between the electrodes of the fuel cell.
Figure 4:
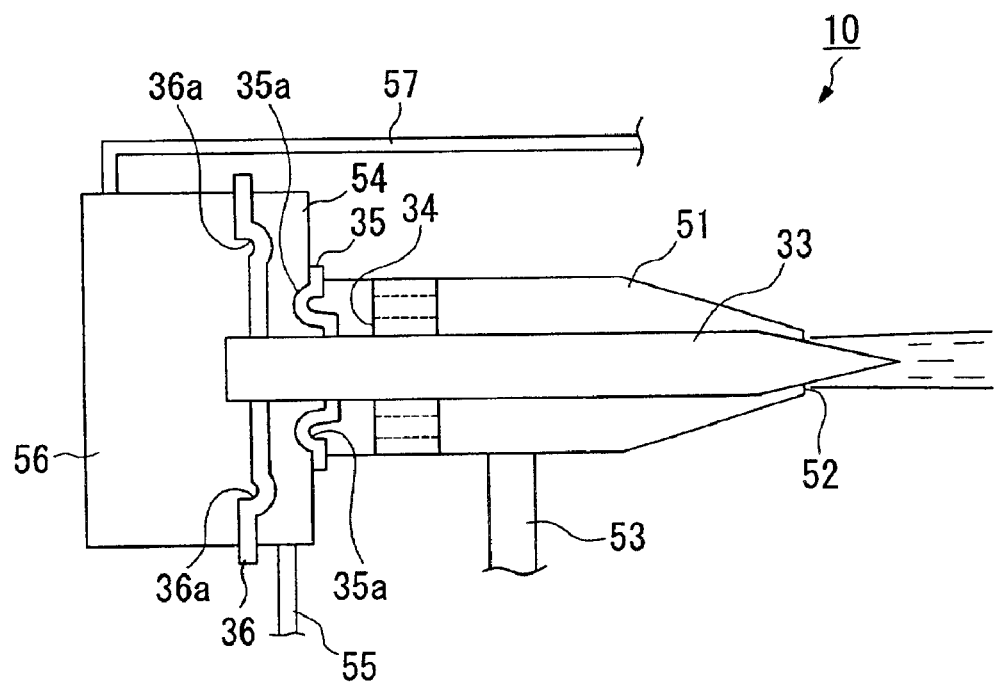
FIG. 4 is a diagram which also shows the general structure of a distinctive portion of the variable flow-rate ejector for explaining changes in the flow rate of the variable flow-rate ejector according to changes in the differential pressure between the electrodes of the fuel cell.

The structure of the fuel cell system 20 having the variable flow-rate ejector 10 in the present embodiment has been explained. Below, the operation of the variable flow-rate ejector 10 will be explained with reference to the drawings. FIGS. 3 and 4 are diagrams for explaining changes in the flow rate of the variable flow-rate ejector 10 according to changes in the differential pressure between the electrodes of the fuel cell 21, where both figures show the general structure of a distinctive portion of the variable flow-rate ejector 10. FIG. 4 shows the displacement of the needle 33 when the differential pressure between the electrodes increases.

In this variable flow-rate ejector 10, the discharged fuel of the fuel cell 21 is supplied from the second fluid supply passage 49, and (new) fuel is supplied from the fuel supply passage 53 to the fluid passage 51 in the nozzle 32. Therefore, the fuel is ejected through the opening 52, that is, through the gap between the nozzle 32 and the needle 33, towards the fluid passage 43 of the diffuser 31. In this process, a negative pressure is produced in the vicinity of the throat portion 44 of the diffuser 31, through which the high-speed fuel stream passes. The fuel as second fluid in the second fluid chamber 48 is drawn into the fluid passage 43 by the negative pressure. The drawn fuel is entrained with the fuel which is ejected from the nozzle 32, and drawn out from the end of the diffuser 31 at the downstream side. Accordingly, the fuel discharged from the fuel cell 21 is circulated via the variable flow-rate ejector 10.

In the fuel supply side pressure control section 27, if the pressure Pa of the fuel supplied to the variable flow-rate ejector 10 is set so as to satisfy the condition "$Pa = P_{air} + 2000$ kPa", where $P_{air}$ is the air pressure, used as a signal pressure, then the pressure $\Delta P1$ applied to the first diaphragm 35 is 200 kPa.

In addition, if the differential pressure between the electrodes of the fuel cell 21 is predetermined, for example, 20 kPa, then the pressure $\Delta P2$ applied to the second diaphragm 36 is 20 kPa.

Accordingly, under the above numerical conditions, the following relationship is always satisfied:

ΔP1:ΔP2=10:1

If the area S1 of the first diaphragm 35, which has not yet been elastically deformed as shown in FIG. 3, is 10 times the area S2 of the second diaphragm 36 which has also not yet been elastically deformed (i.e., S2=10×S1), then the differential pressure between the electrodes of the fuel cell 21 can be automatically maintained at a predetermined pressure of 20 kPa.

When the amount of fuel consumed in the fuel cell 21 is decreased and thus the amount of generated power is also decreased, the differential pressure between the electrodes of the fuel cell 21 is increased. Accordingly, as shown in FIG. 4, the pressure ΔP2 applied to the second diaphragm 36 is increased and the deformable portions 36a and 35a of the second and first diaphragms are elastically deformed in the axial direction, so that the first diaphragm 35 and the second diaphragm 36 are moved.

Accordingly, the needle 33 which is fixed to the second diaphragm 36 and the first diaphragm 35 is displaced in the axial direction (for example, towards the downstream side), and the length of the protruding portion of the needle 33, which protrudes from the opening 52 of the nozzle 32 changes (in the above example, increases). Also accordingly, the open area corresponding to the gap between the inner-peripheral face 32A of the nozzle 32 and the outer-peripheral face 33A of the needle 33 changes (in the above example, decreases), so that the flow rate of the fuel ejected from the opening 52 of the nozzle 32 to the second fluid chamber 48 is controlled (in the above example, decreases).

In the above example, accordingly, the fuel pressure $P_{fuel}$ at the fuel electrode of the fuel cell 21 decreases and the needle 33 is then held at a position where the pressure ΔP1 applied to the first diaphragm 35 is equal to the pressure ΔP2 applied to the second diaphragm 36.

As explained above, the flow rate of the fuel supplied to the fuel cell 21 is controlled based on the variable flow-rate ejector 10 in the present embodiment, the air pressure $P_{air}$ at the air electrode (i.e., cathode) of the fuel cell 21 and the fuel pressure $P_{fuel}$ at the fuel electrode (i.e., anode) of the fuel cell 21. According to this simple structure, a specific necessary differential pressure between the fuel electrode and the air electrode can be precisely controlled while the characteristics relating to the above-explained index are controlled. Therefore, the flow rate of the fuel supplied to the fuel cell 21 can be suitably controlled only by employing a specific mechanical control and without employing electrical control. Consequently, it is possible to avoid complication of the fuel cell system 20, and to decrease the costs necessary for constructing a reliable system.

In the present embodiment, the ratio of the pressure ΔP1 applied to the first diaphragm 35 to the pressure ΔP2 applied to the second diaphragm 36 is predetermined such that "ΔP1:ΔP2=10:1". However, in order to change the pressure ratio, the ratio of the area of the first diaphragm 35 to the area of the second diaphragm 36 may be changed, or the settings or conditions of the fuel supply side pressure control section 27 which typically employs a pneumatic proportional pressure control valve may be changed.

What is claimed is:

1. A variable flow-rate ejector comprising:
   a body;
   a nozzle having a head and a base, each of which has an opening, wherein the nozzle ejects a first fluid from the opening at the head;
   a diffuser whose central axis coincides with that of the nozzle, wherein a second fluid is drawn into the diffuser due to a negative pressure produced around the first fluid ejected by the nozzle, and the second fluid is entrained with the first fluid and the mixed fluid is output;
   a needle inserted into the nozzle, wherein the central axis of the needle coincides with that of the nozzle and the needle is movable along the central axis;
   a first diaphragm whose peripheral portion is supported by the body and which is provided for closing the opening at the base of the nozzle, wherein the first diaphragm is attached to the needle and is movable along the central axis of the needle;
   a second diaphragm whose peripheral portion is supported by the body and which is arranged at a distance from the first diaphragm, wherein the second diaphragm is attached to the needle and is movable along the central axis of the needle;
   a third-fluid chamber formed by the first diaphragm, the second diaphragm, and the body and arranged adjacent to the inside of the nozzle via the first diaphragm, wherein the first fluid is supplied to the nozzle and a third fluid is supplied to the third-fluid chamber; and
   a fourth-fluid chamber formed by the second diaphragm and the body and arranged adjacent to the third-fluid chamber via the second diaphragm, wherein a fourth fluid is supplied to the fourth-fluid chamber, wherein:
   an area of an opening around the needle in the opening at the head of the nozzle is changed by displacement of the needle along the central axis according to movement of the first and second diaphragms which move in accordance with the pressure produced by the first fluid, the third fluid, and the fourth fluid.

2. A variable flow-rate ejector as claimed in claim 1, further comprising:
   a passage for supplying the mixed fluid, which is output by the diffuser, to the fourth-fluid chamber as the fourth fluid.

3. A fuel cell system including a variable flow-rate ejector as claimed in claim 1, comprising a fuel cell which has an anode and a cathode, and a fuel supply section for supplying fuel to the fuel cell, wherein:
   the first fluid is fuel supplied to the anode from the fuel supply section; and
   the second fluid is fuel discharged from the fuel cell.

4. A fuel cell system as claimed in claim 3, further comprising an oxidizing gas supply section for supplying an oxidizing gas to the fuel cell, wherein:
   the third fluid is an oxidizing gas supplied to the cathode of the fuel cell from the oxidizing gas supply section; and
   the fourth fluid is a mixture of the first fluid and the second fluid, which is output by the diffuser.

5. A fuel cell system as claimed in claim 4, wherein:
   the fuel supply section supplies the fuel based on a value of the pressure obtained by adding a predetermined pressure to the pressure of the oxidizing gas; and
   the ratio of the area of the first diaphragm to the area of the second diaphragm is determined based on the predetermined pressure and a differential pressure between a pressure applied to the anode and a pressure applied to the cathode of the fuel cell.

* * * * *